United States Patent [19]

Gordon et al.

[11] Patent Number: 5,195,173
[45] Date of Patent: Mar. 16, 1993

[54] INTEGRATED MULTI-VISUAL EXPERT SYSTEM MAINTENANCE ADVISOR

[75] Inventors: Ira R. Gordon, Farmingdale; Donald A. Franklin, Sound Beach; Brian P. Ford, Port Jefferson Station, all of N.Y.

[73] Assignee: AIL Systems, Inc., Deer Park, N.Y.

[21] Appl. No.: 833,623

[22] Filed: Feb. 7, 1992

Related U.S. Application Data

[63] Continuation of Ser. No. 458,776, Dec. 29, 1989, abandoned.

[51] Int. Cl.$^5$ .............................................. G06F 15/18
[52] U.S. Cl. ...................................... 395/60; 395/902
[58] Field of Search .............................. 395/607, 902

[56] References Cited

U.S. PATENT DOCUMENTS

| | | | |
|---|---|---|---|
| 4,704,692 | 11/1987 | Ladner | 364/513 |
| 4,737,848 | 4/1988 | Araki et al. | 364/513 |
| 4,752,889 | 6/1988 | Rappaport et al. | 364/513 |
| 4,860,204 | 8/1989 | Gendron et al. | 364/513 |
| 4,860,214 | 8/1989 | Matsuda et al. | 364/513 |
| 4,868,763 | 9/1989 | Mosui et al. | 364/513 |
| 4,901,229 | 2/1990 | Tashiro et al. | 364/513 |
| 4,907,973 | 3/1990 | Hon | 434/262 |
| 4,930,077 | 3/1990 | Fan | 364/419 |
| 4,954,964 | 9/1990 | Singh | 364/513 |
| 4,967,368 | 10/1990 | Bolling et al. | 364/513 |

*Primary Examiner*—Allen R. MacDonald
*Assistant Examiner*—George Davis
*Attorney, Agent, or Firm*—Hoffman & Baron

[57] ABSTRACT

An integrated multivisual expert system maintenance advisor system includes an expert system module, a photo-library module and a hypermanual module. The photo-library module and the hypermanual module are linked to each other and to the expert system module. The expert system module utilizes backward and forward chaining "if-then" program rule logic. The rule logic allows for computer program inference reasoning using maintenance technician entered failure systems. The photo-library module includes digitized photograph display processor programming in which magnetically stored digitized photographs are retrieved and processed. The hypermanual module allows instantaneous search and retrieveal of visual display screen of ASCII text character strings by either direct topic search keys or by related or indirect topic search keys, and provides repair and replacement information to the maintenance technician.

4 Claims, 5 Drawing Sheets

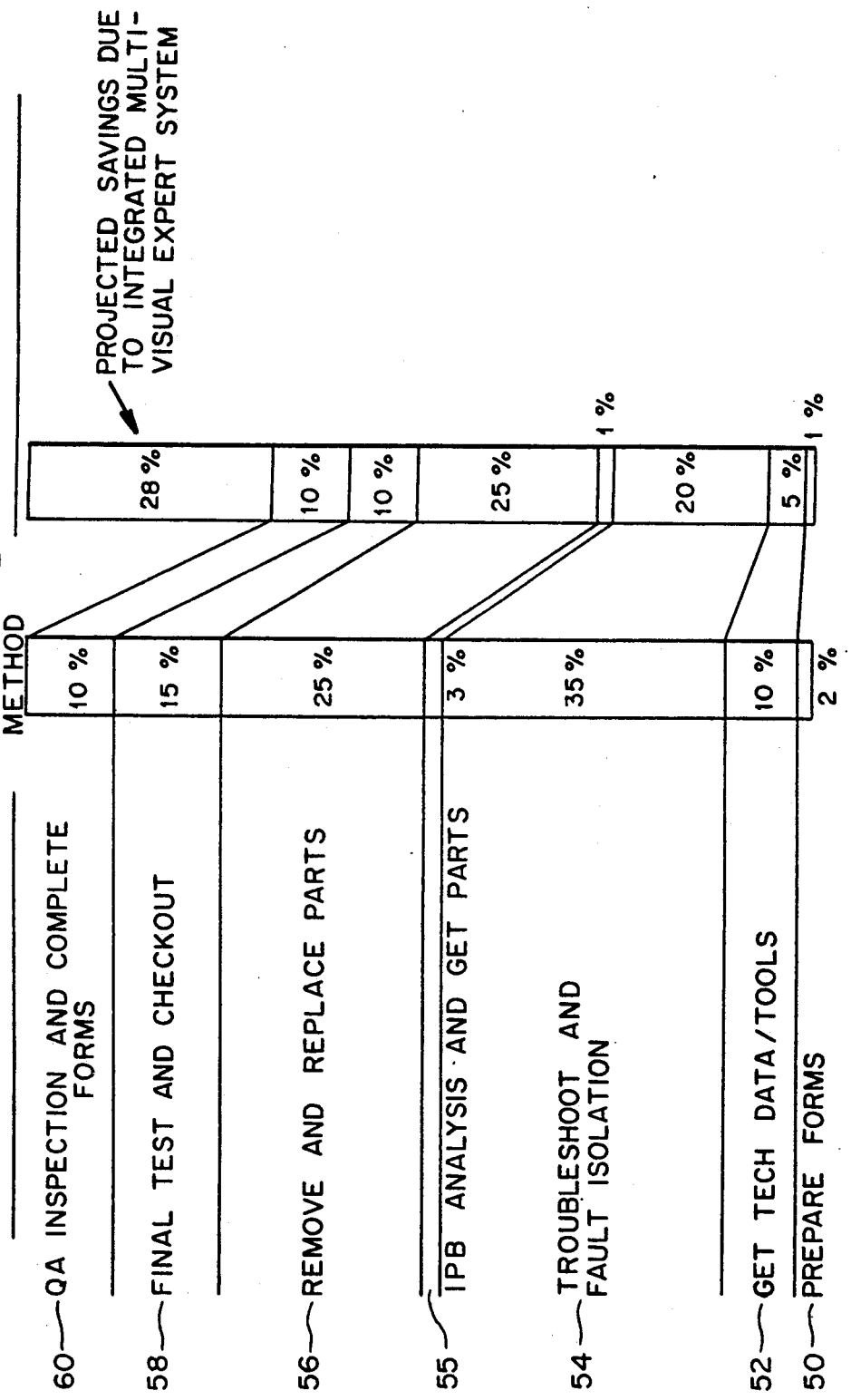

INTEGRATED MULTI-VISUAL EXPERT SYSTEM MAINTENANCE ADVISOR

This is a continuation of copending application Ser. No. 07/458,776 filed on Dec. 29, 1989 now abandoned.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention generally relates to data processing systems, and more particularly relates to a data processing computer system for improving the way diagnostic predictions and subsequent corrective maintenance repairs are calculated and processed by workers involved in maintenance activities for systems that are mechanical, electrical, electronic, or fluid driven.

2. Description of the Prior Art

Current computerized diagnostic systems are generally inefficient due to their lack of an integrated and multivisual approach in generating the diagnostic conclusion (i.e., the answer) to a problem, such as an electrical, or mechanical failure, and associated repair action. The answer or conclusion typically is a string of ASCII text displayed on a visual display, such as a cathode ray tube (CRT) screen, a liquid crystal display (LCD), gas plasma display, or the like. In current diagnostic systems, there are no visual displayed drawings, photographs, or textual narratives describing actual removal, replacement or reinstallation procedures of the components which are diagnosed as having failed. The maintenance technician (MT), under the current system design, is forced to use volumes of written manuals, incurring delays while looking up topics in the index of the manuals, referencing illustrations and finding specific part numbers. The problem can be even more exacerbated due to problems in locating potentially misplaced, outdated, or lost written manuals, thus creating bottle necks in maintenance repair activities.

Prior to the development of automated diagnostic systems, the maintenance technician historically referred to one or two types of manuals or both in isolating and repairing a fault condition. The first is a fault isolation procedure manual. The manual defined the troubleshooting steps to determine which component of a system has failed. The second manual referred to is a fault isolation manual. This manual defined the action the maintenance technician would follow to effect changes in the equipment, for example, replacement of the failed component.

From the two-manual system evolved what is commonly referred to as "expert systems". An expert system is an automated "thinking" process which calculates and evaluates fault paths rapidly and provides guidance to the maintenance technician. The expert system uses a computer and a visual display screen. The computer program of the expert system, in effect, emulates the manual process described previously.

OBJECTS AND SUMMARY OF THE INVENTION

It is an object of the present invention to provide an automated diagnostic system and method which provide more instantaneous and accurate diagnostic analyses.

It is another object of the present invention to provide an integrated multi-visual expert system maintenance system employing an expert system, and a digitized photo-library and hypermanual module which are linked to each other and to the expert system to provide on a visual display screen troubleshooting instructions as well as component repair or replacement information.

It is a further object of the present invention to provide a fully integrated multivisual expert system for diagnostic predictions and corrective maintenance repairs which overcomes the disadvantages of conventional diagnostic systems.

It is yet a further object of the present invention to provide a fully integrated multi-visual expert system for direct use in maintenance technician computer aided training.

In accordance with one form of the present invention, an integrated multi-visual expert system maintenance advisor system includes an artificial intelligence based expert system module, a digitized photographic display (i.e., photo-library) module, and an on-line hypermanual search and retrieve program module. The photo-library module and the hypermanual module are linked to each other and to the expert system module to form an integrated multi-visual diagnostic system.

The expert system module and its associated computer program analyzes the problem and determines which component of the system has failed. The computer program associated with the expert system asks the maintenance technician a series of questions, preferably in a multiple choice selection process, and provides the maintenance technician with answers or conclusions.

The photo-library module is a digitized photograph display processor with associated computer programming. Magnetically stored digitized photographs are retrieved and processed by this element.

The hypermanual module is interlinked directly to the other two modules (i.e., the expert system and the photo-library), and automatically searches and retrieves appropriate repair, replacement or corrective action text and displays this information on a visual display screen.

Through the use of the expert system module, photo-library module, and hypermanual module, pre-programmed training lessons can be complemented and accessed by maintenance personnel. Operator selected maintenance training on a multitude of subjects would be magnetically stored, providing instaneous access. Selection of lessons is performed by visual display screen selection menus. Use of presequenced lesson planning or randomly selectable lessons would be supported.

Lessons could typically include: 1) equipment theory of operation; 2) equipment set-up procedures; 3) specialized operating mode procedures; 4) use of automated expert system tools; and 5) initialization and shut down procedures of the equipment.

Benefits of this training feature of the present invention would appear in more rapid on-the-job training of maintenance personnel and in a minimization of the effect of personnel turnover.

The preferred form of the integrated multi-visual expert system maintenance advisor system, as well as other embodiments, features and advantages of this invention will be apparent from the following detailed description of illustrative embodiments thereof, which is to be read in connection with the accompanying drawings.

BRIEF DESCRIPTION OF THE DRAWINGS

FIG. 5 is a chart comparing the time spent during a manual troubleshooting operation and when using the system of the present invention.

DETAILED DESCRIPTION OF THE PREFERRED EMBODIMENTS

Figure 1:
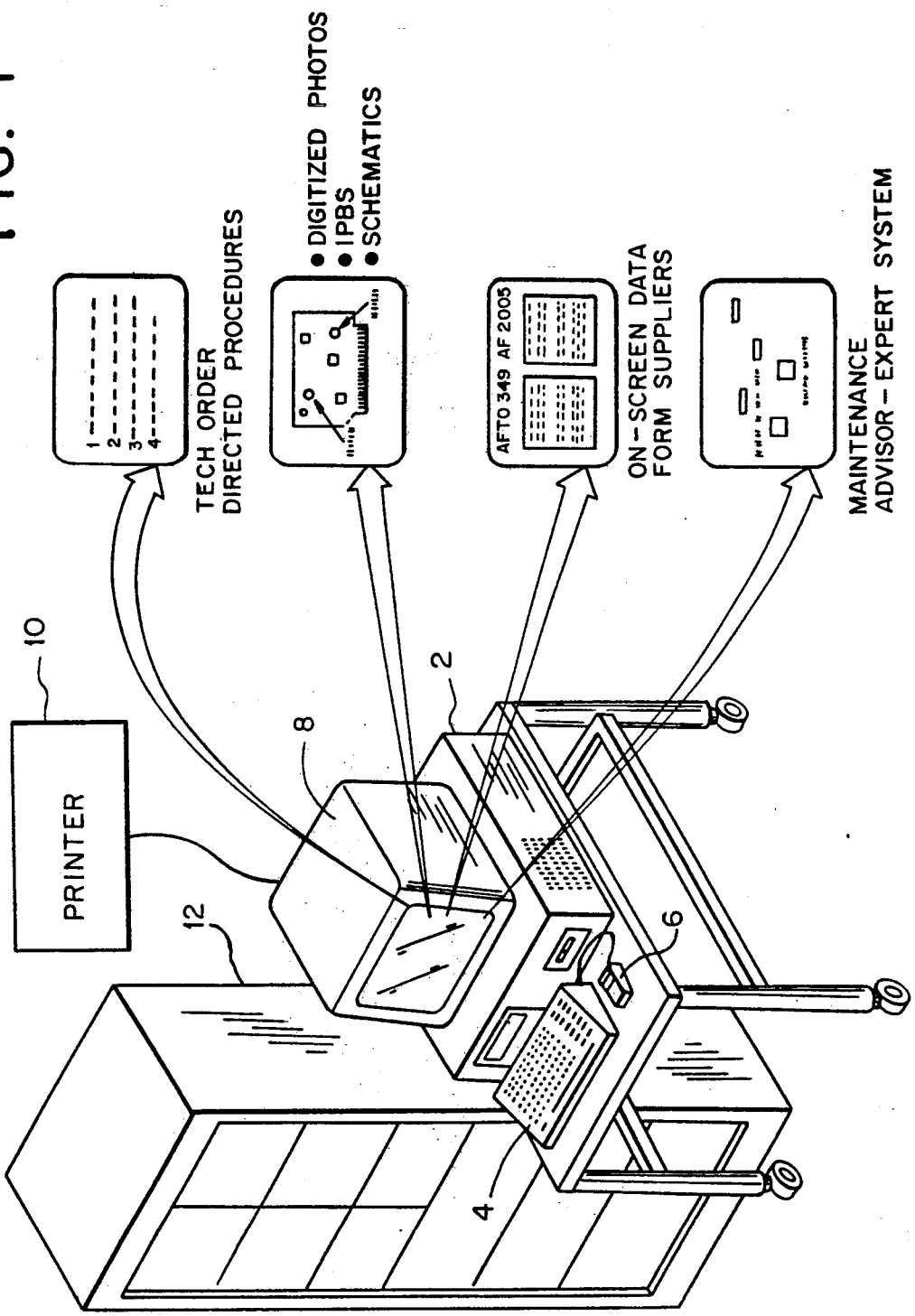
FIG. 1 is a perspective view of the integrated diagnostic system of the present invention.

Referring initially to FIG. 1 of the drawings, an integrated multivisual expert system maintenance advisor system, constructed in accordance with the present invention, basically includes a computer 2 containing an associated memory, a keyboard 4 connected to the computer, a mouse 6 connected to the keyboard, a visual display screen 8 connected to the computer, and a printer 10 linked to the computer.

Also, it may be desirable to include with the system an interface module 12. The interface module 12 connects to the equipment, either mechanical or electrical, being tested and can automatically provide signals to the equipment and monitor the responses to the signals at various test points in the equipment, and store this diagnostic information in a memory associated with and situated in the interface module.

As will be explained in greater detail, the visual display screen 8 will display to the maintenance technician and other maintenance personnel various types of diagnostic information. This diagnostic information includes test procedures, i.e., questions posed to the maintenance technician for the diagnostic system to determine which component has failed, analysis information, that is, conclusions and answers based on the questions posed, digitized photographs and other repair information, such as schematics, on screen forms for work reports and ordering parts, and other information.

Figure 2:
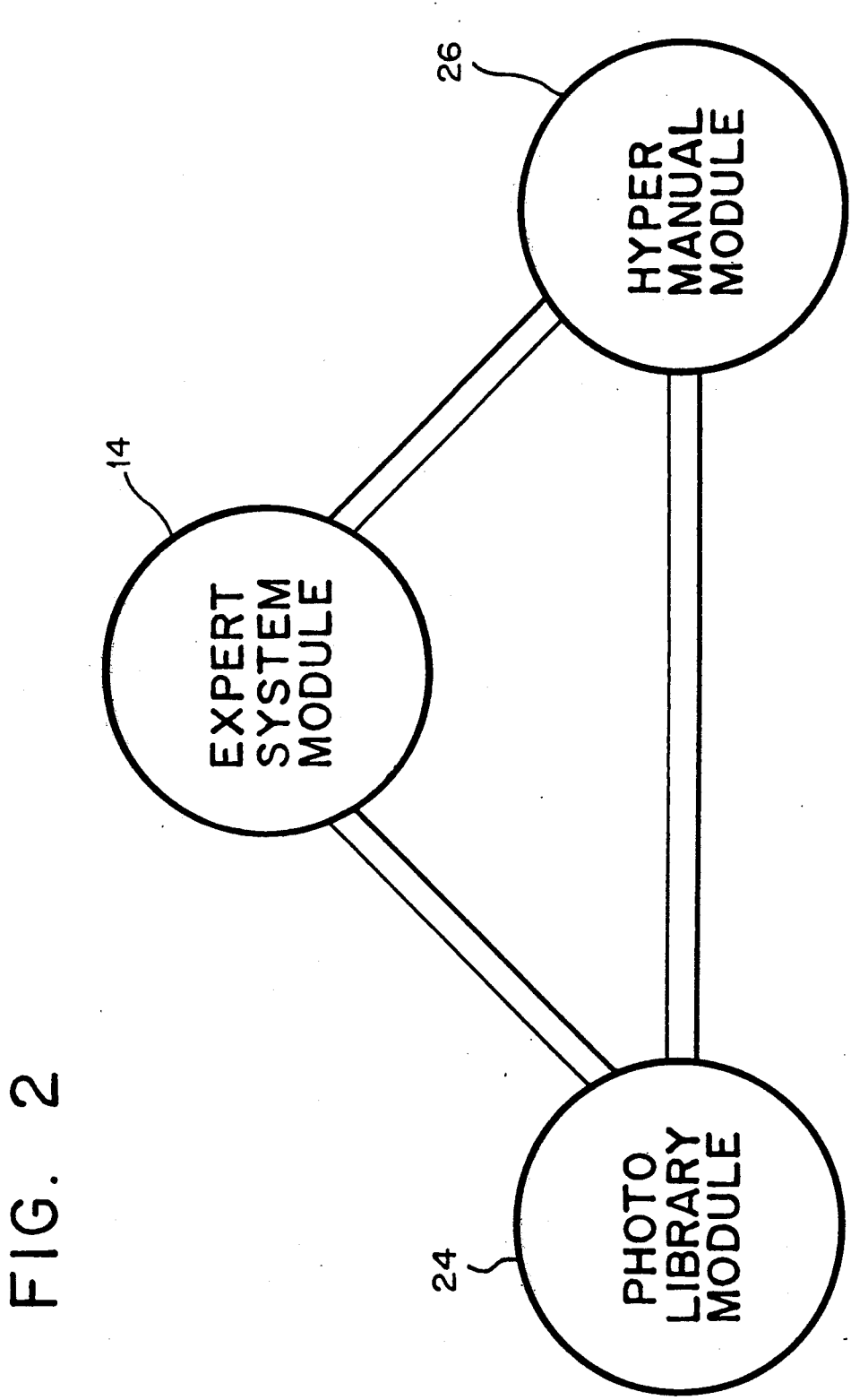
FIG. 2 is a block diagram of the integrated diagnostic system of the present invention.

As shown in FIG. 2 of the drawings, the integrated multivisual expert system maintenance advisor system of the present invention basically includes a triad of computer modules or elements and their associated programs.

The first core software element is the expert system module 14. This module 14 utilizes backward and forward chaining, "if-then", program rule logic. The rule logic allows for computer programmed inference reasoning using maintenance technician entered failure symptoms such that evaluation and data processing will lead to a calculated diagnostic conclusion and corrective repair activity.

Figure 3:
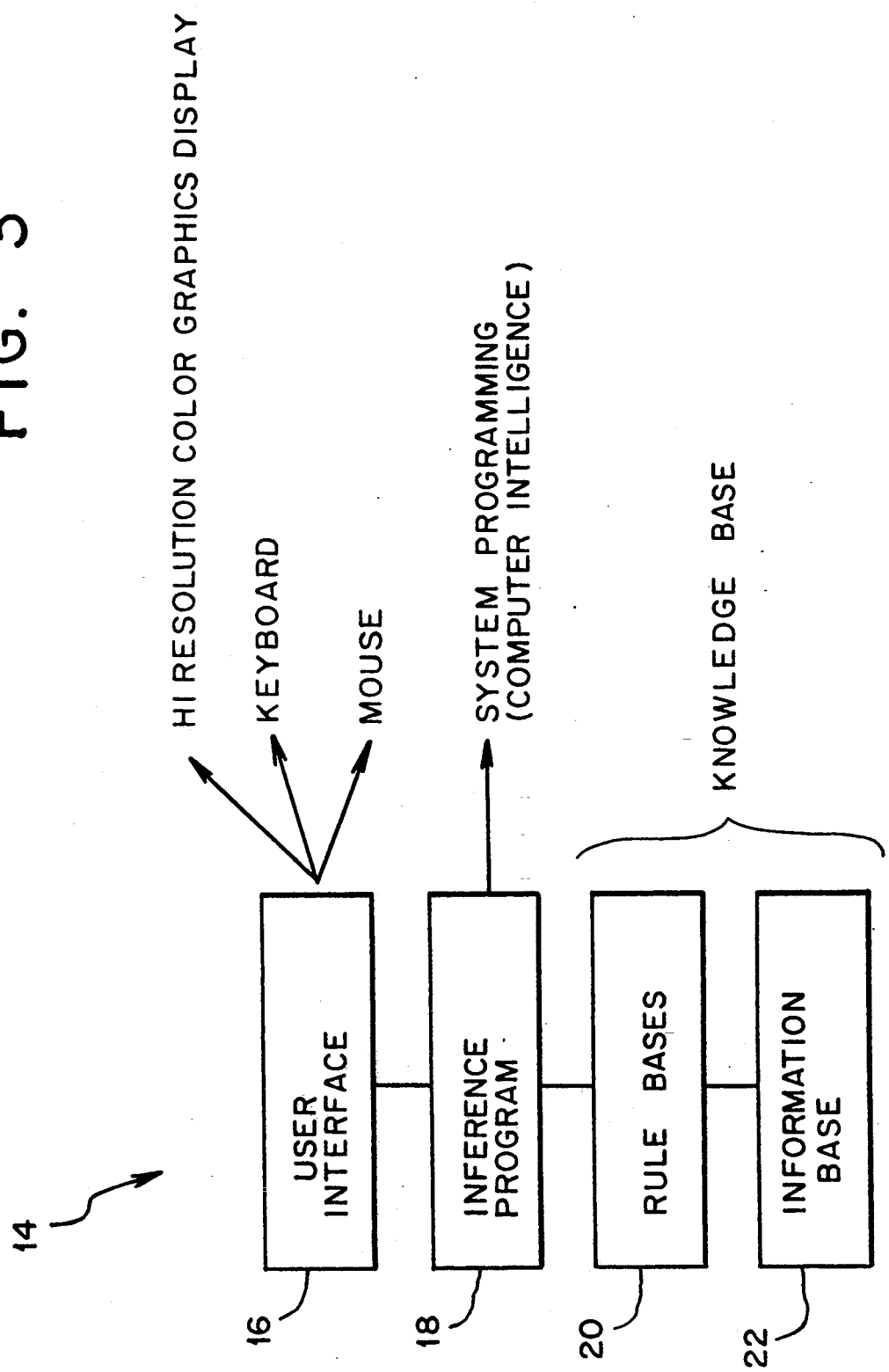
FIG. 3 is a simplified block diagram of the expert system module portion of the integrated diagnostic system of the present invention.

As more specifically illustrated by FIG. 3, the expert system module 14 includes a maintenance technician interface section 16, so that the diagnostic system of the present invention can interface with the visual display screen 8, the keyboard 4 and the mouse 6. The expert system module 14 further includes an inference processing algorithm section 18, which is responsible for the artificial computer intelligence programming of the expert system module. The inference programming section 18 cooperates with the maintenance technician interface section 16 and performs the analysis based on information provided to the expert system module by the maintenance technician.

The expert system module 14 further includes a knowledge base section. The knowledge base section may be more specifically divided into a rule base section 20 and an information base section 22 The rule base section 20 presents a set of questions to the maintenance technician, which questions may be in a multiple choice format. The information base section 22 receives data either from the maintenance technician or directly from the equipment being tested through the interface module 12, and provides this information to the rule base section 20.

Returning to FIG. 2 of the drawings, the integrated multivisual expert system maintenance advisor system of the present invention further includes a second core software element or module referred to as a photo-library module 24. The photo-library module 24 is a digitized photograph display processor and its associated programming. The display processor magnetically stores digitized photographs, retrieves the digitized photographs and processes them. The digitized photographs are displayed on the visual display screen 8.

The photo-library module 24 includes an IBM VGA standard graphics display subsystem (which includes the CRT display 8). Graphic resolution of 640×480 pixels using 16 shades of gray and 320×200 pixels using 256 shades of gray are typical display presentations.

The photo-library module 24 is directly linked to the expert system module 14. When a diagnostic conclusion is calculated by the inference engine section 18 of the expert system module 14, information regarding the failed component is directly transferred to the photo-library module 24. The photo-library module 24 then can be activated by the system operator to display the digitized photograph on the visual display screen 8 of the computer.

The photo-library module 24 also contains in memory electrical schematics, illustrated part break downs and line art, all of which may be displayed on the visual display screen 8.

The integrated multivisual expert system maintenance advisor system of the present invention further includes a third core element referred to as the hyper-manual module 26. This element is interlinked directly to the other two elements (that is, the photo-library module 24 and the expert system module 14). The hypermanual module 26 and its associated program is designed to allow instantaneous search and retrieval of visual display screen of ASCII text character strings by either direct topic search keys or by related or indirect topic search keys. The expert system module 14 directly passes diagnostic conclusion data to the hypermanual module 26, whereupon an automatic search and retrieval of the appropriate repair, replacement or corrective action text is performed by the hypermanual module 26. The maintenance trainer, through a selection menu screen appearing on the visual display screen 8, may select to display the hypermanual module processed text information.

Figure 4:
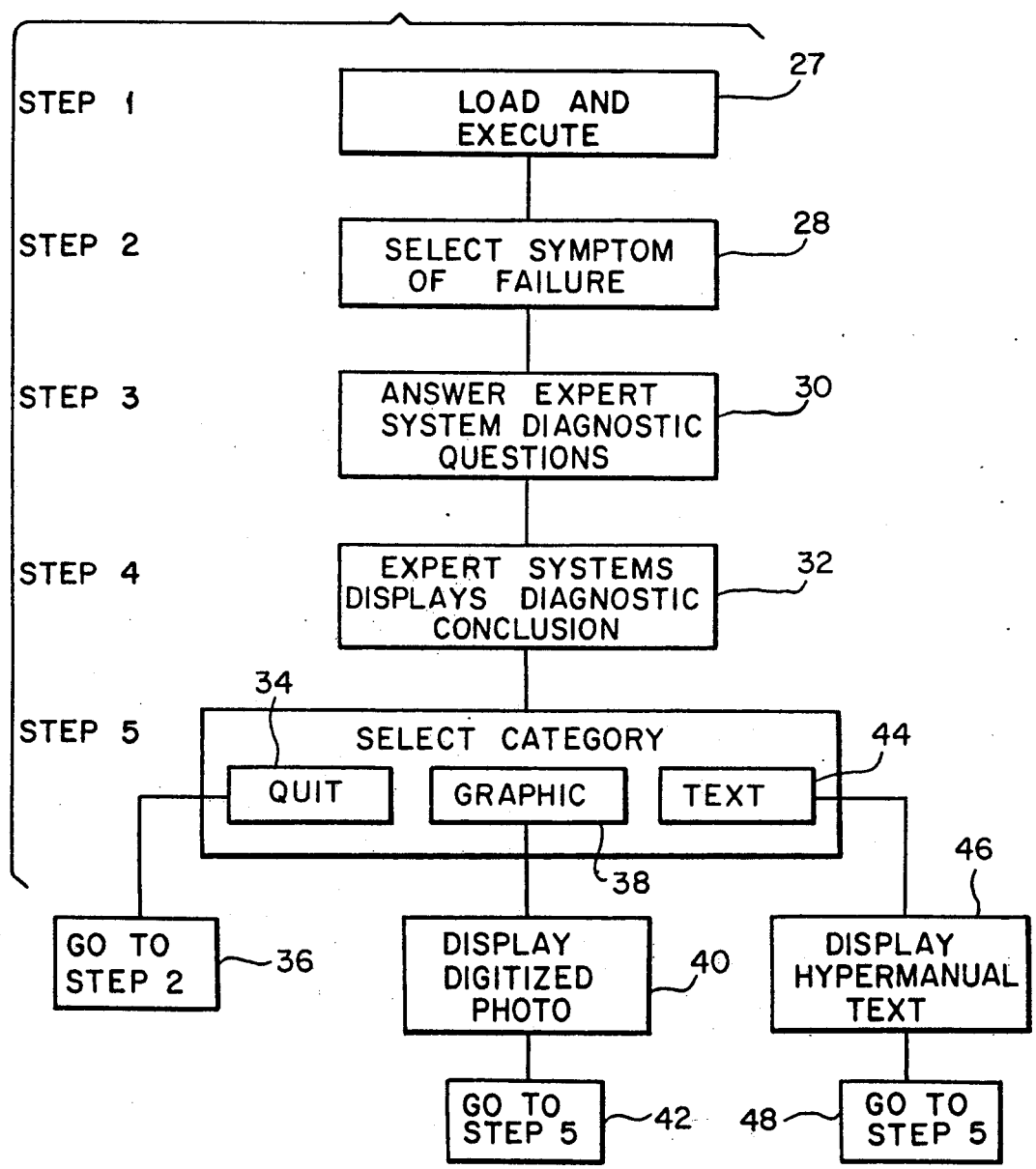
FIG. 4 is a flow chart illustrating the operation of the system in analyzing a fault condition and providing repair information regarding the same.

An operational computer program of the diagnostic system of the present invention is illustrated by FIG. 4 of the drawings. There are five basic steps in the operational sequence.

Step 1 involves loading and executing the main program of the diagnostic system (Block 27). A menu is then displayed on the visual display screen. The menu lists a number of major failures which the maintenance technician may wish to diagnose. In the second step, therefore, the maintenance technician selects a symptom of failure displayed on the menu by using the keyboard 4 (Block 28).

The third step in the operation of the diagnostic system is where the expert system asks the maintenance technician a series of diagnostic questions. These questions may be in a multiple choice format which simplifies the analysis process for the maintenance technician, as well as speeding up the process. The maintenance technician answers via the keyboard 4 the questions posed by the expert system and displayed on the visual display screen 8 (Block 30).

In the fourth step of the operation, the expert system analyzes the answers provided to it and reaches a diagnostic conclusion, which conclusion is displayed on the visual display screen 8 (Block 32).

The fifth step of the operation is where the maintenance technician, provided with the calculated conclusion to the problem, can make one of several selections to help him in his troubleshooting of the equipment. First, he may feel that he does not need help given the visually displayed conclusion, and may exit the program at this stage (Block 34). The program will then return to displaying in step 2 the menu of various failures which may have occurred, so that the maintenance technician may select another symptom of failure (Block 36). The operation then proceeds in the manner described previously.

Second, the maintenance technician may wish to select photograph processing, i.e., the graphic category (Block 38). He may wish to see the part that has to be replaced or where it is located in the equipment being tested. When this category is selected, the photo-library module 24 will locate the data file pertaining to the particular component diagnosed as having failed, and will display photographs pertaining to such on the visual display screen 8 (Block 40). The operation will then return to step 5 (Block 42) where the maintenance technician may select the same or a different category.

Third, the maintenance technician may select hypermanual processing, i.e., the text category (Block 44). Instructions on how to make the repair, order forms and part information will be displayed on the visual display screen by the hypermanual module 24 (Block 46). The operational program will then return to step 5 where the maintenance technician may select a different category (Block 48).

FIG. 5 illustrates the projected time savings in troubleshooting equipment in a particular application using the present invention. The time incurred in each stage of manual troubleshooting and repair is shown in the left hand column and compared with that using the present invention shown the right hand column.

When a failure is detected in the equipment, the first step 50 is basically to prepare the necessary maintenance forms and record keeping to begin the troubleshooting operation. In a manual operation, the completion of the forms is estimated to take 2% of the time incurred in a troubleshooting and repair operation. However, the integrated diagnostic system of the present invention is adapted to help the maintenance technician fill out the necessary forms and complete the paperwork which, in the particular application illustrated by FIG. 5, reduced the time required for troubleshooting to 1%.

The next step 52 is to obtain the necessary technical data and tools to do the troubleshooting. This has been estimated to take 10% of the maintenance cycle in a manual operation. However, with the present invention, the diagnostic system will advise the maintenance technician what data and tools are necessary to make the repairs, resulting in a reduction in the time for this step to 5% of the maintenance cycle.

The next step 54 is the actual troubleshooting and fault isolation step. Manually, this has been estimated to occupy 35% of the time of a maintenance cycle. In this step, the maintenance technician must identify what is wrong with the equipment, and he conventionally used manuals to guide him in the troubleshooting procedure.

The integrated diagnostic system of the present invention, however, has reduced the time of this portion of the maintenance cycle to about 20%, as it guides the maintenance technician through troubleshooting and fault isolation.

The next step 55 in the maintenance cycle is to do an illustrated parts breakdown analysis and to obtain the replacement parts. This step involves going through the parts catalog and obtaining the part number of the failed component to order a replacement part. The time estimated for completing this step manually is 3% of the total maintenance cycle time.

The system of the present invention is capable of illustrating the parts and any other associated drawings, as well as the part number of the component which has been diagnosed as having failed. By using the present invention, the time allotted for this step has been reduced to 1%.

The next step 56 in the maintenance process is to remove and replace the failed components. Manually, the time this step takes is about 25% of the total maintenance cycle. This time is the same for troubleshooting using the diagnostic system of the present invention as it is for manual troubleshooting.

The next step 58 in a maintenance procedure is a final test and checkout. Manually, the maintenance technician must know the test procedure, and he obtains this information by looking it up in a manual. It has been estimated that this step takes 15% of the time required in a manual maintenance operation.

The present invention provides an on-line test procedure, and it has been estimated that the time required for final test and checkout is reduced to 10% of the maintenance cycle.

In many applications, after the final test and checkout has occurred, there is a quality assurance inspection and "sign-off" step 60, involving the completion of one or more forms. It is estimated that the time for this step takes about 10% of the total time in the maintenance operation either manually or using the diagnostic system of the present invention.

Accordingly, it is estimated that the integrated diagnostic system of the present invention may conservatively save 28%, and as much as 40%, in the time required to complete a normal maintenance operation.

The expert system program and hypermanual program may be derived using the program, VP Expert, manufactured by Paperback Software Co. in Berkeley, Calif. This program is, in effect, a computer language which facilitates the creation of the expert system and hypermanual program.

To facilitate an understanding of the invention, an example of a computer program, in source code, is provided herewith and is incorporated herein as forming part of the disclosure of the invention. The computer program was implemented in accordance with the present invention and operates in conjunction with an IBM PC personal computer as a maintenance advisory system for an oil cooling cart for an aircraft. It is envisioned that other programs may be similarly implemented for other applications in accordance with the present invention.

It can thus be seen that the integrated multivisual expert system maintenance advisor system of the present invention quickly and accurately isolates a fault in equipment being tested and provides guidance to the maintenance technician in removing or replacing the faulty components. The system of the present invention eliminates the need to refer to manuals in conducting the troubleshooting or repair, and reduces the overall time estimated to be needed in a maintenance operation.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

```
!
! ACES Demo                                   Maintenance Advisory System Program
! With Aspect Ratio Correction                for Oil Cooling Cart
! 9-19-89 DAF 15:19:00                        © AIL SYSTEMS, INC. 1989
!                                             All Rights Reserved.
runtime;
endoff;
bkcolor=0; !Black background
actions
!        call c:\aa\aaplay,"c:\aa\flix.txt"
         g=16
         color=15   !Bright white text
         reset all
         display" Oil Cooling Cart Diagnostics
"
         find symptom
         trouble=(symptom)
      display "Looking for a solution to the {TROUBLE} problem.
"
         find fix
         find end_action
-!  Write the trouble and fix to a tracking database.
         append results
         display "Normal completion.";

!*************** Backward Chaining Rules ***************

RULE 33
IF     type=hydraulic and
       CIRCUIT=AUXILIARY AND
       HOOKUP<>A8_&_A9
THEN   FIX=SETUP_ERROR
       RESET SYMPTOM
              end_action=exit_system
       COLOR=30
       DISPLAY "                    {FIX}"
       COLOR=15
       DISPLAY "
  In order to use the {CIRCUIT} circuit you should be using the A8 and A9
hoses.  Press any key to continue. "
;

RULE 34
IF     type=hydraulic and
       CIRCUIT=AUXILIARY AND
       METERS_OR_GAUGES=PS1_UTIL_PRESSURE
THEN   FIX=SETUP_ERROR
       RESET SYMPTOM
              end_action=exit_system
```

```
        color=30
        DISPLAY "                    {fix}"
        color=15
        DISPLAY "
  You are reading the wrong meter set.  You should be reading the meters
under the group marked {CIRCUIT}.  Press any key to continue. ¯"
;
RULE 34A
IF      type=hydraulic and
        CIRCUIT=AUXILIARY AND
        METERS_OR_GAUGES=FM1_FLOW_METER
THEN    FIX=SETUP_ERROR
        RESET SYMPTOM
                end_action=exit_system
        color=30
        DISPLAY "                    {fix}"
        color=15
        DISPLAY "
  You are reading the wrong meter set.  You want to read the meters under the
group marked {CIRCUIT}.  Press any key to continue. ¯"
;

RULE 34B
IF      type=hydraulic and
        CIRCUIT=AUXILIARY AND
        METERS_OR_GAUGES=FM2_FLOW_METER
THEN    FIX=SETUP_ERROR
        RESET symptom
                end_action=exit_system
        color=30
        DISPLAY "                    {fix}"
        color=15
        DISPLAY "
  You are reading the wrong meter set.  You should be reading the meters
under the group marked {CIRCUIT}.  Press any key to continue. ¯" ;

RULE 34C
IF      type=hydraulic and
        CIRCUIT=AUXILIARY AND
        METERS_OR_GAUGES=FM3_FLOW_METER
THEN    FIX=SETUP_ERROR
        RESET symptom
                end_action=exit_system
        color=30
        DISPLAY "                    {fix} "
        color=15
        DISPLAY "
  You are reading the wrong meter set.  You want to read the meters under the
group marked {CIRCUIT}.  Press any key. ¯" ;

RULE 32
IF      type=hydraulic and
        CIRCUIT=UTILITY AND
        HOOKUP=A8_&_A9
THEN    FIX=SETUP_ERROR
        RESET symptom
                end_action=exit_system
        color=30
        DISPLAY "                    {fix}"
        color=15
        DISPLAY "
  In order to use the {CIRCUIT} circuit you should be using the A6 and A7
hoses.  Press any key to continue. ¯" ;
RULE 35
IF      type=hydraulic and
        CIRCUIT=UTILITY AND
        METERS_OR_GAUGES=FM4_FLOW_METER OR
        METERS_OR_GAUGES=PS2_AUX_PRESSURE
THEN    FIX=SETUP_ERROR
        RESET symptom
```

```
                    end_action=exit_system
         color=30
         DISPLAY "                   {fix}"
         color=15
         DISPLAY "
  You are reading the wrong meter set.  You want to read the meters under the
group marked {CIRCUIT}.  Press any key. ˉ" ;

!............ DIAGNOSTIC RULES ............

RULE 0
IF     type=hydraulic and
         TROUBLE=NO_FLOW_PUMP_RUNS AND
         FILTER=NO
THEN     FIX=REPLACE_FILTER
         FOTO=PIC1
         DISPLAY "
  Recommended corrective action is to {FIX}.

The filter element is restricting the flow of oil through the system.

Press any key. ˉ"
         BECAUSE "The filter can only absorb 300 ML. of water.ˉ"
;

RULE 1
IF     type=hydraulic and
         TROUBLE=NO_FLOW_PUMP_RUNS AND
         OIL_GAUGE=YES
THEN     FIX=REFILL_RESERVOIR
            FOTO=rulE1
         DISPLAY "
Recommended corrective action is to {FIX}.

The oil reservoir must be filled for the pump to primed and operate
normally.
  Press any key. ˉ"
         BECAUSE "The oil reservoir must be filled to capacity."
;

RULE 2
IF     type=hydraulic and
         TROUBLE=NO_FLOW_PUMP_RUNS AND
         OIL_GAUGE=NO AND
         FILTER=YES
THEN     FIX=CLEAN_SUCTION_LINE
            FOTO=PIC2
         DISPLAY "
Recommended corrective action is to {FIX}.

The fault is in the pump/reservoir assembly.  Press any key to continue. ˉ "
         BECAUSE "The problem is in the pump/reservoir
assembly.  The pump is operating and there was no lack of oil or filter clog."
;

RULE 3
IF     type=hydraulic and
         TROUBLE=FLOW_RATE_LOW AND
         FILTER=NO AND
         BYPASS=NO
THEN     FIX=REPLACE_FILTER
            FOTO=PIC1
         DISPLAY "
Recommended corrective action is to {FIX}.

Moisture or debris have clogged the filter and restricted the oil
flow.  Press any key. ˉ"
```

BECAUSE "Moisture or debris may have restricted the oil flow."
;

RULE 3A
IF      type=hydraulic and
        TROUBLE=FLOW_RATE_LOW AND
        FILTER=NO AND
        BYPASS=YES
THEN    FIX=ADJUST_BYPASS_VALVE
        FOTO=PIC3
        DISPLAY "
Recommended corrective action is to {FIX}.

The system is operating correctly.  Adjustment of the bypass valve
has corrected the flow rate.  Press any key to continue. "
        BECAUSE "Operator adjustment may solve problem."
;

RULE 4
IF      type=hydraulic and
        TROUBLE=FLOW_RATE_LOW AND
        OCC_LRU=LOW_BOTH_WAYS AND
        UTIL_AUX=NO_CHANGE AND
        BYPASS=NO AND
        OIL_TEMP=VERY_HIGH OR
        OIL_TEMP=HIGH
THEN    FIX=REPLACE_HEAT_EXCHANGER
        FOTO=PIC4
        DISPLAY "
Recommended action is to {FIX}.

The fault is not in the LRU and cannot be corrected by adjusting
the bypass valve.  This and the increase in oil temperature indicates the
heat exchanger is the cause of the fault.  Press any key to
continue. "
        BECAUSE "The heat exchanger is now suspect as a problem."
;
RULE 4A
IF      type=hydraulic and
        TROUBLE=FLOW_RATE_LOW AND
        OCC_LRU=LOW_BOTH_WAYS AND
        UTIL_AUX=NO_CHANGE AND
        BYPASS=YES
THEN    FIX=ADJUST_BYPASS_VALVE
        FOTO=PIC3
        DISPLAY "
Recommended corrective action is to {FIX}.

The system is operating correctly.  Adjustment of the bypass valve
has corrected the flow rate.  Press any key to continue. "
        BECAUSE "Operator adjustment may solve the problem."
;

RULE 4B
IF      type=hydraulic and
        TROUBLE=FLOW_RATE_LOW AND
        OCC_LRU=LOW_BOTH_WAYS AND
        UTIL_AUX=NO_CHANGE AND
        OIL_TEMP=VERY_LOW AND
        BYPASS=NO
THEN    FIX=WARM_UP_OIL
        FOTO=rule4b
        DISPLAY "
Recommended corrective action is to {FIX}.

Extremely low temperatures can cause very low oil viscosity which retards
flow through the system.  Press any key to continue. "
        BECAUSE "This is due to the laws of physics."
;

```
RULE 5
IF      type=hydraulic and
          TROUBLE=FLOW_RATE_LOW AND
          OCC_LRU=LOW_BOTH_WAYS AND
          UTIL_AUX=NO_CHANGE AND
          BYPASS=NO AND
          OIL_TEMP=NORMAL OR
          OIL_TEMP=LOW
THEN    FIX=CLEAN_OR_REPLACE_DISCHARGE_LINE
          FOTO=PIC1
          DISPLAY "
Recommended action is to {FIX}.

There is not any fault in the LRU.  The pump is operational
and adjusting the bypass valve did not correct the flow rate.  The fault is
in the discharge line.  Press any key to continue. "
          BECAUSE "The other possibility points towards the heat exchanger."
;

RULE 5A
IF      type=hydraulic and
          TROUBLE=FLOW_RATE_LOW AND
          OCC_LRU=LOW_BOTH_WAYS AND
          UTIL_AUX=NO_CHANGE AND
          BYPASS=YES
THEN    FIX=ADJUST_BYPASS_VALVE
          FOTO=PIC3
          DISPLAY "
Recommended action is to {FIX}.

The system is operating correctly.  Adjustment of the bypass valve
has corrected the flow rate.  Press any key to continue."
          BECAUSE "The operator may correct the problem by an adjustment."
;

RULE 6
IF       type=hydraulic and
          TROUBLE=FLOW_RATE_LOW AND
          OCC_LRU=ONLY_WITH_LRU AND
          BYPASS=NO
THEN    FIX=REFER_TO_LRU_DATA
          FOTO=rule6
          DISPLAY "
Recommended action is to {FIX}.

The LRU is clogged or has restricted flow.  Press any key. "
          BECAUSE "This problem occurs only with the LRU."
;

RULE 6A
IF  ,   type=hydraulic and
          TROUBLE=FLOW_RATE_LOW AND
          OCC_LRU=ONLY_WITH_LRU AND
          BYPASS=YES
THEN    FIX=ADJUST_BYPASS_VALVE
          FOTO=PIC3
          DISPLAY "
Recommended corrective action is to {FIX}.  Press any key. "
          BECAUSE "The operator may make an adjustment to correct the problem."
;

RULE 7
IF      type=hydraulic and
          TROUBLE=FLOW_RATE_LOW AND
          UTIL_AUX<>NO_CHANGE AND
          BYPASS=NO
```

```
THEN    FIX=CLEAN_OR_REPLACE_COUPLERS_AND_HOSES
        FOTO=PIC5
        DISPLAY "
Recommended corrective action is to {FIX}.  Press any key. "
        BECAUSE "Any difference in flow between cables indicates one or both
is restricted."
;

RULE 7A
IF      type=hydraulic and
        TROUBLE=FLOW_RATE_LOW AND
        UTIL_AUX<>NO_CHANGE AND
        BYPASS=YES
THEN    FIX=ADJUST_BYPASS_VALVE
        FOTO=rule7a
        DISPLAY "
Recommended corrective action is to {FIX}.  Press any key. "
        BECAUSE "An adjustment may correct the problem."
;

RULE 10
IF      type=hydraulic and
        TROUBLE=FLOW_LOW_1_CKT_ONLY AND
        OCC_LRU=ONLY_WITH_LRU AND
        BYPASS=NO
THEN    FIX=REFER_TO_LRU_DATA
        FOTO=rule10
        DISPLAY "
Recommended corrective action is to {FIX}.

The LRU is clogged or has restricted flow.  Press any key. "
        BECAUSE "This problem occurs only with the LRU."
;

RULE 10A
IF      type=hydraulic and
        TROUBLE=FLOW_LOW_1_CKT_ONLY AND
        OCC_LRU=ONLY_WITH_LRU AND
        BYPASS=YES
THEN    FIX=ADJUST_BYPASS_VALVE
        FOTO=PIC3
        DISPLAY "Recommended corrective action is to {FIX}."
        BECAUSE "This problem occurs only with the LRU."
;

RULE 8
IF      type=hydraulic and
        TROUBLE=FLOW_LOW_1_CKT_ONLY AND
        UTIL_AUX=NO_CHANGE AND
        OCC_LRU=LOW_BOTH_WAYS AND
        BYPASS=NO
THEN    FIX=REPLACE_METERS_OR_GAUGES
        FOTO=PIC3
        DISPLAY "
Recommended Action is {FIX}.

The FLOW METER in the {CIRCUIT} circuit is clogged.  Press any key. "
        BECAUSE "The LRU and external hoses as well as the heat exchanger
are not involved."
;

RULE 8A
IF      type=hydraulic and
        TROUBLE=FLOW_LOW_1_CKT_ONLY AND
        UTIL_AUX=NO_CHANGE AND
        OCC_LRU=LOW_BOTH_WAYS AND.
```

```
            BYPASS=YES
THEN    FIX=ADJUST_BYPASS_VALVE
            FOTO=PIC3
        DISPLAY "
Recommended corrective action is to {FIX}.  Press any key. ~"
        BECAUSE "An adjustment may solve the problem."
;

RULE 9
IF      type=hydraulic and
        TROUBLE=FLOW_LOW_1_CKT_ONLY AND
        OCC_LRU<>NO_CHANGE AND
        BYPASS=NO
THEN    FIX=CLEAN_OR_REPLACE_HOSE_ASSEMBLY
            FOTO=PIC6
        DISPLAY "
Recommended action is to {FIX}.  Press any key to continue. ~"
        BECAUSE "A change in flow due to hoses/couplers indicates a
faulty assembly."
;

RULE 9A
IF      type=hydraulic and
        TROUBLE=FLOW_LOW_1_CKT_ONLY AND
        OCC_LRU<>NO_CHANGE AND
        BYPASS=YES
THEN    FIX=ADJUST_BYPASS_VALVE
            FOTO=PIC3
        DISPLAY "
Recommended corrective action is to {FIX}.  Press any key. ~"
        BECAUSE "An adjustment may solve the problem."
;

RULE 11
IF      type=hydraulic and
        TROUBLE=PRESSURE_LOW AND
        PRESSURE=VERY_LOW AND
        OIL_TEMP<>LOW AND
        OIL_TEMP<>VERY_LOW
THEN    FIX=REPLACE_HYDRAULIC_LINES
            FOTO=PIC7
        DISPLAY "
Recommended corrective action is to {FIX}.  Press any key. ~"
        BECAUSE "The most massive pressure drop with an increase in
oil temperature is created by clogged hydraulic lines."
;

! BPF 8/22/89. Have Don & Ira check this rule.....
RULE 11A
IF      type=hydraulic and
        TROUBLE=PRESSURE_LOW AND
        PRESSURE=VERY_LOW AND
        OIL_TEMP=LOW OR
        OIL_TEMP=VERY_LOW
THEN    FIX=RECHECK_ALL_READINGS
            foto=rule11a
        DISPLAY "
Recommended action is to {FIX}.

It is considered outside the normal operating parameter for the pressure
and the oil temperature to be low (or very low) at the same time.  Press any
key to continue. ~"
        BECAUSE "Case outside normal operating parameters."
;

RULE 12
IF      type=hydraulic and
        TROUBLE=PRESSURE_LOW AND
```

```
              PRESSURE=LOW AND
              OIL_TEMP<>LOW AND
              OIL_TEMP<>VERY_LOW
THEN       FIX=REPLACE_PUMP
              FOTO=PIC8
           DISPLAY "
Recommended corrective action is {FIX}.  Press any key. ~"
           BECAUSE "This indicates the pump gears are worn."
;

RULE 13
IF         type=hydraulic and
           TROUBLE=PRESSURE_LOW AND
           PRESSURE=LOW AND
           OIL_TEMP=LOW or
           trouble=PRESSURE_LOW and
           PRESSURE=LOW AND
           OIL_TEMP=VERY_LOW
THEN       FIX=REPLACE_RELIEF_VALVE
              FOTO=PIC8
           DISPLAY "
Recommended corrective action is {FIX}.  Press any key. ~"
           BECAUSE "The relief valve is bypassing the CKT via the heat
exchanger thereby lowering the pressure as well as the temperature."
;

!--------------------------------ELECTRICAL RULES-------------------
RULE 14
IF         TROUBLE=NO_MOTOR_NO_LAMPS AND
           PLUGGED_IN=NO
THEN       FIX=PLUG_IN_CART
              FOTO=rule14
           DISPLAY " Recommend you plug the cart in to live AC
outlet.  Press any key. ~"
           BECAUSE "This is the most classic cockpit_error of all time."
;

RULE 14A
IF         TROUBLE=NO_MOTOR_NO_LAMPS AND
           SWITCH_ON=NO
THEN       FIX=TURN_ON_SWITCH
              FOTO=rule14a
           DISPLAY "
Recommended you turn on power switch S6.  Press any key. ~"
           BECAUSE "This is the 2ND most classic cockpit_error of all time."
;

RULE 15
IF         TROUBLE=NO_MOTOR_NO_LAMPS AND
           FUSE<>FUSE_GOOD
THEN       FIX=REPLACE_FUSE
              FOTO=rule15
           DISPLAY "
Recommended corrective action is to {FIX}.  Press any key. ~"
           BECAUSE "The fuse is defective or missing."
;

RULE 16
IF         TROUBLE=NO_MOTOR_NO_LAMPS AND
           S6_SWITCH<>PROPERLY
THEN       FIX=REPLACE_SWITCH
              FOTO=PIC9A
           DISPLAY "
Recommended corrective action is {FIX}.  Press any key. ~"
           BECAUSE "Operator will be requested to make measurement."
;
```

```
RULE 17
IF      TROUBLE=NO_MOTOR_NO_LAMPS AND
        PWR_SUPPLY<>OK
THEN    FIX=REPLACE_POWER_SUPPLY
            FOTO=PIC9A
        DISPLAY "
Recommended corrective action is {FIX}.  Press any key. ~"
        BECAUSE "the power supply measured bad."
;

RULE 18
IF      TROUBLE=NO_MOTOR_NO_LAMPS AND
        ZENER<>OK
THEN    FIX=REPLACE_REGULATOR_DIODE_VR1
            FOTO=PIC9A
        DISPLAY "
Recommended corrective action is to {FIX}.  Press any key. ~"
        BECAUSE "Zener voltage regulation S/B 3.9 VDC"
;

RULE 18A
IF      TROUBLE=NO_MOTOR_NO_LAMPS AND
        ZENER=OK AND
        PWR_SUPPLY=OK
THEN    FIX=MULTIPLE_COMPONENTS
            FOTO=PIC9B
        DISPLAY "
  Conclusion is that {FIX} are bad.  Recommended action is:

(1) - Replace A1K3 and A1K4.
        (2) - Measure A1R3 for 1300 OHMS + or - 20%,
              and if out of spec replace R3.
If R3 is OK replace DS3 power indicator lamp.  Press any key. ~"
        BECAUSE "Zener voltage regulation S/B 3.9 VDC"
;

RULE 19
IF      TROUBLE=NO_FAN_SOME_SPEEDS AND
        FAN_SWITCH<>AC_EACH_POS
THEN    FIX=REPLACE_FAN_SWITCH
            FOTO=PIC9B
        DISPLAY "
Recommended corrective action is {FIX}.  Press any key. ~"
        BECAUSE "the fan switch measures bad."
;

RULE 20
IF      TROUBLE=NO_FAN_SOME_SPEEDS AND
        FAN_SWITCH=AC_EACH_POS
THEN    FIX=REPLACE_FAN_MOTOR_ASSEMBLY_A5_B1
            FOTO=PIC10
        DISPLAY "
Recommended corrective action is to {FIX}.  Press any key. ~"
        BECAUSE "Switch measured good"
;

RULE 21
IF      TROUBLE=NO_FAN_ALL_SPEEDS AND
        FAN_SWITCH=NO_AC AND
        K3_RELAY=LIT_&_NO_VOLTS
THEN    FIX=REPLACE_DL1
            FOTO=PIC9A
        DISPLAY "
Recommended corrective action is to {FIX}.  Press any key. ~"
        BECAUSE "DL1 has to be defective to read no voltage."
;
```

```
RULE 22
IF      TROUBLE=NO_FAN_ALL_SPEEDS AND
        K3_RELAY=LIT_&_24V
THEN    FIX=REPLACE_RELAY_K3
            FOTO=PIC9A
        DISPLAY "
Recommended corrective action is {FIX}.  Press any key. ~"
        BECAUSE "Relay K3 is energized but not making contact."
;

RULE 23
IF      TROUBLE=NO_FAN_ALL_SPEEDS AND
        FAN_SWITCH<>NO_AC
THEN    FIX=REPLACE_FAN_MOTOR_ASSEMBLY_A5_B1
            FOTO=PIC10
        DISPLAY "
Recommended corrective action is to {FIX}.  Press any key. ~"
        BECAUSE "Voltage is present to the fan yet it does not work."
;
RULE 24
IF      TROUBLE=NO_FAN_ALL_SPEEDS AND
        MAN_FAN_SPEED=NO_AC
THEN    FIX=REPLACE_SWITCH
        FOTO=PIC9B
        DISPLAY "
  Recommended corrective action is {FIX}.

Press any key. ~"
        BECAUSE "Voltage is present to but not thru the switch."
;

RULE 25
IF      TROUBLE=NO_PUMP_MOTOR AND
        PUMP_MOTOR=NO_AC
THEN    FIX=REPLACE_RELAY
        FOTO=PIC9B
        DISPLAY "
  Recommended corrective action is {FIX}.

There would be AC power at the pump motor if the relay was OK.
  Press any key to continue. ~"
        BECAUSE "AC should be avaliable via the K4 relay."
;

RULE 26
IF      TROUBLE=NO_PUMP_MOTOR AND
        PUMP_MOTOR=AC
THEN    FIX=REPLACE_MOTOR
        FOTO=PIC1
        DISPLAY "
  Recommended corrective action is {FIX}.

There is AC power at the pump motor but it will not work.  Press any key. ~"
        BECAUSE "AC is available to the motor but it does not work."
;

RULE 28
IF      TROUBLE=AURAL_ALARM_&_LAMP AND
        ALARMS=HIGH_OIL_TEMP
THEN    FIX=CHECK_OIL_TEMP
            FOTO=PIC5
        DISPLAY "
  Recommended action is {FIX}.

CAUTION
   The alarm system monitors only high temp. and low flow conditions.  Observe
the readings in the {CIRCUIT} circuit and re-enter data under SYMPTOM, or if
readings appear normal for the circuit, check the inlet {CIRCUIT} CONNECTOR
SENSE ELEMENT TS1 for possible malfunction.  Press any key. ~" ;

RULE 28A
```

```
IF      TROUBLE=AURAL_ALARM_&_LAMP AND
        ALARMS=LOW_OIL_FLOW
THEN    FIX=CHECK_OIL_FLOW
            FOTO=PIC7
        DISPLAY "
  Recommended action is to (FIX) on the
  (CIRCUIT) circuit.
                        CAUTION
    The alarm system monitors only high temp. and low flow conditions.  Observe
the readings in the !active circuit (CIRCUIT) and re-enter data under
symptom, or if readings appear normal for the circuit, check the inlet
(CIRCUIT) FLOW SENSE ELEMENTS in the A2 HYDRAULIC PANEL ASSY for possible
malfunction.  Press any key to continue. ~" ;

RULE 29
IF      TROUBLE=ALARM_LAMP_NO_AURAL AND
        S4=NO AND
        S4_COMMON=NO
THEN    FIX=AUDIBLE_ALARM
            FOTO=PIC9A
        DISPLAY "
  Recommended action is to replace (FIX).

CAUTION
    The alarm system monitors only high temp. and low flow conditions.  Observe
the readings in the active (CIRCUIT) circuit and re-enter data under
symptom, or if readings appear normal for the circuit, check the inlet
(CIRCUIT) CONNECTOR SENSE ELEMENT TS1 for possible malfunction.  Press any
key to continue. ~" ;

RULE 30
IF      TROUBLE=ALARM_LAMP_NO_AURAL AND
        S4=NO AND
        S4_COMMON=YES
THEN    FIX=CHECK_A1S4_&_A1K2
            FOTO=PIC9B
        DISPLAY "
  (FIX): Measure resistance from K2 pin 4 to ground.
  It should be 1 OHM or less.  If higher replace A1K2.  If OK replace A1S4.

CAUTION
    The alarm system monitors only high temp. and low flow conditions.  Observe
the readings in the !active (circuit) circuit and re-enter data under
symptom, or if readings appear normal for the circuit, check the inlet
(CIRCUIT) CONNECTOR SENSE ELEMENT TS1 for possible malfunction.  Press any
key. ~" ;

RULE 31
IF      TROUBLE=ALARM_LAMP_NO_AURAL AND
        S4=YES
THEN    FIX=ALARM_BYPASS_SWITCH
            FOTO=PIC9B
        DISPLAY "
  The (FIX) S4 is in wrong position.
  Place alarm bypass switch S4 to the OFF position.

CAUTION
    The alarm system monitors only high temp. and low flow conditions.  Observe
the readings in the !active circuit (CIRCUIT) and re-enter data under
symptom, or if readings appear normal for the circuit, check the inlet
(CIRCUIT) CONNECTOR SENSE ELEMENT TS1 for possible malfunction.  Press any
key. ~" ;

!**************** Temperature Rules ****************

RULE VERY_HIGH_TEMP
IF  T>=126
THEN OIL_TEMP=VERY_HIGH
        display "
An oil temperature of (t) is considered abnormally high."
    RESET T;
```

```
RULE HIGH_TEMP
IF   T>116 AND
     T<126
THEN OIL_TEMP=HIGH
     RESET T;

RULE NORMAL_TEMP
IF   T<=115 AND
     T>=91
THEN OIL_TEMP=NORMAL
     RESET T;

RULE LOW_TEMP
IF   T<90 AND
     T>=50
THEN OIL_TEMP=LOW
     RESET T;

RULE VERY_LOW_TEMP
IF   T<50
THEN OIL_TEMP=VERY_LOW
         display "
An oil temperature of (t) degrees F. is considered very low. "
     RESET T;

!************* Backward Chaining System Rules ************** rule all_done
if continue=quit
then end_action=exit_system;

rule go_to_graphics
if continue=graphic and
   foto<>unknown
then end_action=call_show
         clron
         call show,"/v:1 (foto)"
         reset continue
         reset end_action;

rule go_to_hypertext
if continue=tech_order
then end_action=hypertext
         gmode 16
         mouseon
                 gcls
         exit=no
                 top=no
                 previous=no
         reference=(fix)
         whiletrue exit=no then
            clist=(reference)
         end
                 mouseoff
         tmode;

!*************** Forward Chaining Rules ****************
whenever hydraulic_problems_1
if type=unknown and
   trouble=no_flow_pump_runs or
   trouble=pressure_low
then type=hydraulic;

whenever hydraulic_problems_2
if type=unknown and
   trouble=flow_rate_low or
   trouble=flow_low_1_ckt_only
then type=hydraulic;

!*************** Forward Chaining System Rules ****************
```

```
whenever exit_key_action
if exit=yes
then foo=(reference)
     reset reference;

whenever previous_key_action
if previous=yes
then reset previous
     reset reference
     previous=no
     pop clist, current
     pop clist, reference;

whenever user_wants_a_picture_from_hypertext
if picture=yes
then pict=(reference)
     reset reference
     reset top
     reset previous
     reset exit
     tmode
         clron
     call show," /v:1 (pict)"
     mouseon
     gmode 16
     top=no
     exit=no
     picture=no
     previous=no
     reference=(pict);

whenever Goto_the_top_hyperword
if   top=yes
then top=no
     reference=contents;
whenever special_picture_rule_51
if   reference=fig_5_1
then pict=(reference)
     reset reference
     reset top
         reset picture
     reset previous
     reset exit
     tmode
         clron
     call show," /v:1 PIC4"
     mouseon
     gmode 16
     top=no
     exit=no
     picture=no
     previous=no
     pop clist, reference;

whenever picture_rule_52
if   reference=fig_5_2
then pict=(reference)
     reset reference
     reset top
         reset picture
     reset previous
     reset exit
     tmode
         clron
     call show," /v:1 PIC7"
     mouseon
     gmode 16
     top=no
     exit=no
```

```
        picture=no
        previous=no
        pop clist, reference;

whenever picture_rule_53
if   reference=fig_5_3
then pict=(reference)
     reset reference
     reset top
         reset picture
     reset previous
     reset exit
     tmode
         clron
     call show," /v:1 PIC9A"
     mouseon
     gmode 16
     top=no
     exit=no
     picture=no
     previous=no
     pop clist, reference;

whenever picture_rule_54
if   reference=fig_5_4
then pict=(reference)
     reset reference
     reset top
         reset picture
     reset previous
     reset exit
     tmode
         clron
     call show," /v:1 PIC10"
     mouseon
     gmode 16
     top=no
     exit=no
     picture=no
     previous=no
     pop clist, reference;

whenever picture_rule_54
if   reference=fig_5_4
then pict=(reference)
     reset reference
     reset top
         reset picture
     reset previous
     reset exit
     tmode
         clron
     call show," /v:1 PIC10"
     mouseon
     gmode 16
     top=no
     exit=no
     picture=no
     previous=no
     pop clist, reference;

whenever picture_rule_55
if   reference=fig_5_5
then pict=(reference)
     reset reference
     reset top
         reset picture
     reset previous
     reset exit
     tmode
```

```
     clron
call show," /v:1 PIC1"
mouseon
gmode 16
top=no
exit=no
picture=no
previous=no
pop clist, reference;

whenever picture_rule_57
if   reference=fig_5_7
then pict=(reference)
     reset reference
     reset top
         reset picture
     reset previous
     reset exit
     tmode
         clron
     call show," /v:1 PIC6"
     mouseon
     gmode 16
     top=no
     exit=no
     picture=no
     previous=no
     pop clist, reference;

whenever picture_rule_58
if   reference=fig_5_8
then pict=(reference)
     reset reference
     reset top
         reset picture
     reset previous
     reset exit
     tmode
         clron
     call show,"/v:m PIC12"
     mouseon
     gmode 16
     top=no
     exit=no
     picture=no
     previous=no
     pop clist, reference;

whenever picture_rule_68a
if   reference=fig_6_8a
then pict=(reference)
     reset reference
     reset top
         reset picture
     reset previous
     reset exit
     tmode
         clron
     call show,"PIC13"
     mouseon
     gmode 16
     top=no
     exit=no
     picture=no
     previous=no
     pop clist, reference;

whenever picture_rule_68b
if   reference=fig_6_8b
then pict=(reference)
     reset reference
```

```
    reset top
        reset picture
    reset previous
    reset exit
    tmode
        clron
    call show,"PIC14"
    mouseon
    gmode 16
    top=no
    exit=no
    picture=no
    previous=no
    pop clist, reference;
```

!************* Required System Statements ************** lbutton exit: 68,1,4,7,Exit;

lbutton top: 8,1,4,7,Contents;

lbutton previous: 28,1,4,7,Previous;

hypertext reference: 2,2,78,24,ref;

plural: clist;

ask continue:
"How do you want to continue?";

choices continue: Quit, Graphic, Tech_Order;

!************* Statements ***************

ASK SYMPTOM:
"What is the SYMPTOM of the problem?
Use the ARROW KEYS to move to a selection, press ENTER to select.";

CHOICES SYMPTOM: ALARM_LAMP_NO_AURAL,AURAL_ALARM_&_LAMP,
FLOW_LOW_1_CKT_ONLY,FLOW_RATE_LOW,PRESSURE_LOW,NO_FLOW_PUMP_RUNS,
NO_FAN_ALL_SPEEDS,NO_FAN_SOME_SPEEDS,NO_MOTOR_NO_LAMPS,NO_PUMP_MOTOR;

ASK OIL_GAUGE:
"Check the OIL LEVEL GAUGE on the rear of the cart. Is the oil level
BELOW THE 3/4 FULL MARK on the sight gauge?";
CHOICES OIL_GAUGE: YES ,NO;

ASK FILTER:
"Has the OIL FILTER ELEMENT been changed during the past 6 months and is
the OIL free of water contamination or moisture?  Select response from
the following: ";
CHOICES FILTER: YES ,NO;

ASK OCC_LRU:
"Is the FLOW RATE low only with an LRU connected but good with
 the OCC TEST SET connected?

Select response from the following: ";
CHOICES OCC_LRU:ONLY_WITH_LRU,LOW_BOTH_WAYS;

ASK UTIL_AUX:
"Replace the UTILITY circuit hoses and couplers A6 & A7 with the
AUXILIARY circuit hoses and couplers A8 & A9.  Is there any change
in the FLOW RATE?  Select response from the following: ";
CHOICES UTIL_AUX:INCREASE,NO_CHANGE,DECREASE;

ASK T:
"What is the OIL TEMPERATURE (in Degrees Fahrenheit)? ";
RANGE T: 0,250;

```
ASK PRESSURE:
"Is the pressure just LOW or is it VERY LOW?
information about pressure ranges.  Select response from the following: ";
CHOICES PRESSURE: LOW,VERY_LOW;

ASK PLUGGED_IN:
"Is the Oil Cooling Cart PLUGGED IN to a LIVE AC outlet?
Select response from the following: ";
CHOICES PLUGGED_IN:YES,NO;

ASK SWITCH_ON:
"Is the power switch TURNED ON?
Select response from the following: ";
CHOICES SWITCH_ON: YES,NO;

ASK FUSE:
"Check the AC line FUSE on the Oil Cooling Cart.
Select response from the following: ";
CHOICES FUSE: FUSE_GOOD,FUSE_BAD,FUSE_MISSING;

ASK S6_SWITCH:
"Check the FUNCTION  of the S6 switch with an AC voltmeter.  Is the
switch operating properly?
Select response from the following: ";
CHOICES S6_SWITCH: PROPERLY,ALWAYS_OFF,ALWAYS_ON;

ASK PWR_SUPPLY:
"Check for +28 VDC at the PS1 POWER SUPPLY OUTPUT with a voltmeter.
ADJUST THE VOLTAGE for +28 VDC (within + or - 5%) if necessary.
Select response from the following: ";
CHOICES PWR_SUPPLY: LOW,OK,HIGH;

ASK ZENER:
"Check for approx. 3.9 VDC across VR1 ZENER DIODE with a voltmeter.
Select response from the following: ";
CHOICES ZENER: LOW,OK,HIGH;

ASK FAN_SWITCH:
"Unplug the A5W1 wire from the heat exchanger fan motor at the A1
electrical panel assembly CONNECTOR J8.  Measure from pin 15 to
pins 13,14,16 for 115 VAC as the SWITCH S5 is rotated from LOW to
MEDIUM to HIGH respectively.  Select response from the following: ";
CHOICES FAN_SWITCH:AC_EACH_POS,NO_AC,NO_AC_SOME_POS;

ASK K3_RELAY:
"Place the MANUAL SWITCH S3 to ON.  Observe that the POWER INDICATOR
LAMP DS3 is ILLUMINATED.  Measure K3 RELAY pins 1 to 2 for approx 24 VDC.
Select response from the following: ";
CHOICES K3_RELAY: LIT_&_24V,LIT_&_NO_VOLTS;

ASK MAN_FAN_SPEED:
"On the Oil Cooling Cart place the MANUAL SWITCH S3 to ON.
Observe that the POWER INDICATOR LAMP DS3 is ILLUMINATED.  Measure A1S5
FAN SPEED SWITCH pins A1S5 common to A1J8_15 for 115 VAC with a voltmeter.
Select response from the following: ";
CHOICES MAN_FAN_SPEED:AC, NO_AC;

ASK PUMP_MOTOR:
"Remove the pump motor POWER CONNECTOR A4W2-P2 from the A1J10
CONNECTOR.  With a voltmeter measure the A1J10 connector pins 14 to
16 for 115 VAC.  Select response from the following: ";
CHOICES PUMP_MOTOR: AC,NO_AC;

ASK ALARMS:
"Check the following for {TROUBLE} and highlight the CAUSE? ";
CHOICES ALARMS: LOW_OIL_FLOW,HIGH_OIL_TEMP;

ASK BYPASS:
"Does ADJUSTING the BYPASS VALVE V1 correct the flow rate?";
CHOICES BYPASS: YES,NO;
```

```
ASK CIRCUIT:
"Which POSITION is the SELECTOR VALVE V2 in?";
CHOICES CIRCUIT: UTILITY,DIFF_PRESSURE,AUXILIARY;

ASK HOOKUP:
"Is the test being conducted using hoses A6 AND A7 or
A8 AND A9 ?";
CHOICES HOOKUP: A6_&_A7,A8_&_A9;

ASK METERS_OR_GAUGES:
"Indicate which of the meters show the problem.";
CHOICES METERS_OR_GAUGES: PS1_UTIL_PRESSURE,PS2_AUX_PRESSURE,
PS3_DIFF_PRESSURE,FM1_FLOW_METER,FM2_FLOW_METER,FM3_FLOW_METER,FM4_FLOW_METER;

ASK S4:
"Is the ALARM BYPASS SWITCH S4 in the ON position?";
CHOICES S4: YES,NO;

ASK S4_COMMON:
"Place a jumper wire from A1S4 common to ground.  Does the ALARM
now SOUND ?";
CHOICES S4_COMMON: YES,NO;
```

What is claimed is:

1. An integrated multivisual expert system maintenance advisor system, which comprises:
   an expert system module;
   a photo-library module operatively linked to the expert system module;
   a hypermanual module operatively linked to the photo-library module and the expert system module;
   a computer having a computer memory, the expert system module, photo-library module and hypermanual module forming at least portions of the computer memory;
   a keyboard operatively linked to the computer;
   a visual display screen operatively linked to the computer; and
   a printer operatively linked to the computer, the computer memory portion of which the hypermanual module is formed having stored therein repair and replacement information.

2. An integrated multivisual expert system maintenance advisor system as defined by claim 1, wherein the expert system module utilizes backward and forward chaining "if-then" program rule logic.

3. An integrated multivisual expert system maintenance advisor system as defined by claim 1, wherein the expert system includes a maintenance technician interface portion, an inference engine portion operatively linked to the maintenance technician interface portion, a rule base portion operatively linked to the inference engine portion, and an information base portion operatively linked to the rule base portion.

4. An integrated multivisual expert system maintenance advisor system as defined by claim 1, wherein the computer memory portion of which the photo-library module is formed has stored therein digitized photographs.

* * * * *